E. E. CHAPIN.
FILTER.
APPLICATION FILED JUNE 29, 1916.
1,288,508.
Patented Dec. 24, 1918.
3 SHEETS—SHEET 3.
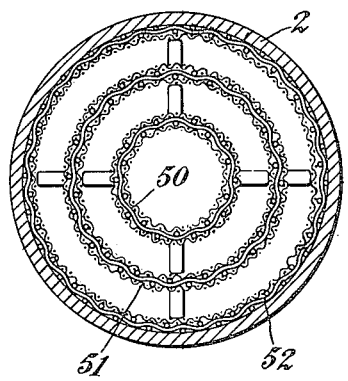
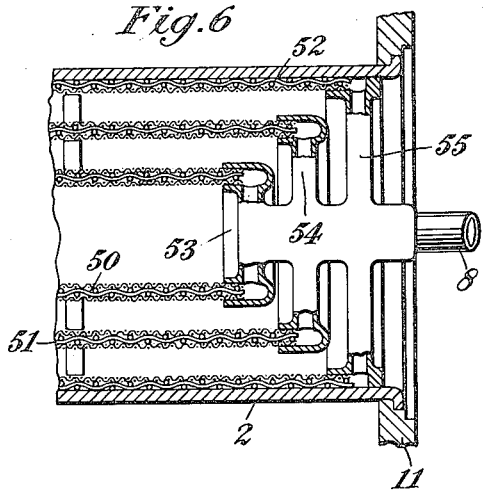
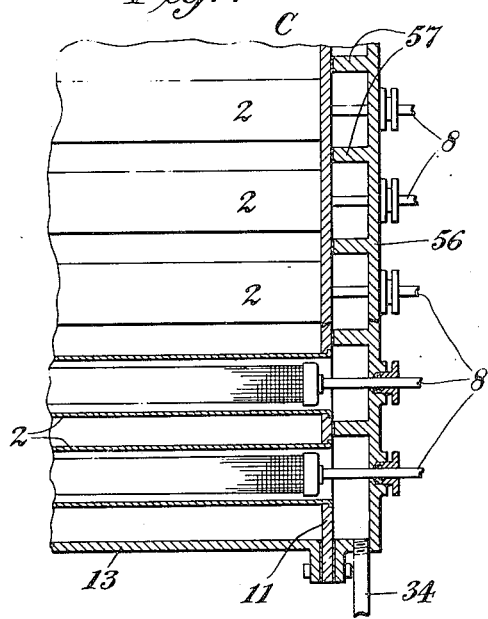
Inventor:
Edward E. Chapin,
by ................
Attorney
Witness:
Chas. D. King.

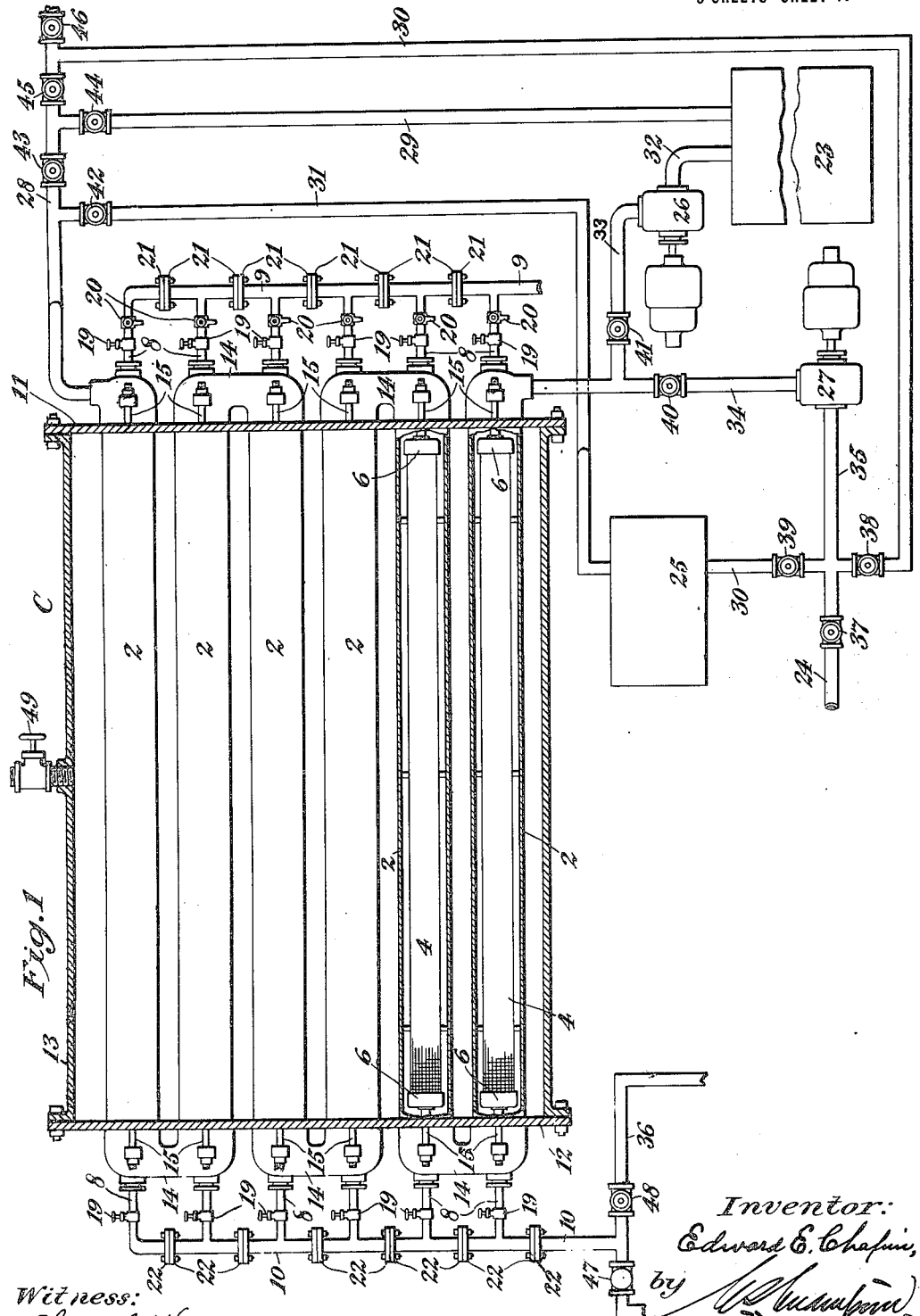

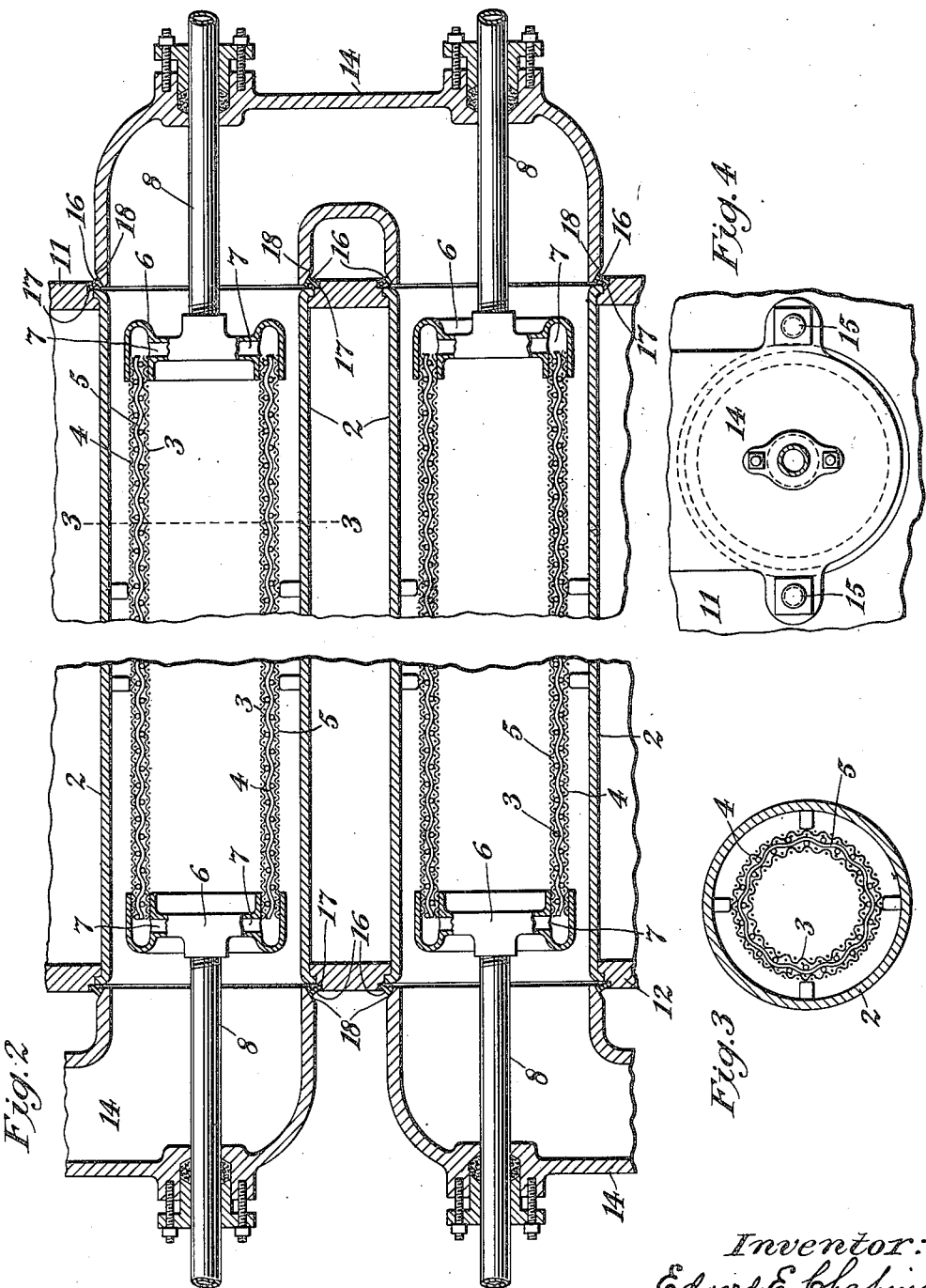

UNITED STATES PATENT OFFICE.

EDWARD E. CHAPIN, OF WYOMING, NEW JERSEY.

FILTER.

1,288,508.  Specification of Letters Patent.  Patented Dec. 24, 1918.

Application filed June 29, 1916. Serial No. 106,652.

*To all whom it may concern:*

Be it known that I, EDWARD E. CHAPIN, a citizen of the United States, and a resident of Wyoming, in the county of Essex and State of New Jersey, have invented certain new and useful Improvements in Filters, of which the following is a specification.

This invention relates to filters, and especially to slime filters, and the main object of the invention is to provide a new type of filter by means of which slimes, such for example as those met with in sugar work, may be filtered more perfectly and with greater economy than in any of the types of filters known to me heretofore used.

Leaf-filters heretofore used in sugar work are of a type in which leaf-filters of a flat or disk-like structure have been employed as the principal filtering media. In practice leaf filter-plates of this character have many disadvantages which are especially marked when it becomes necessary to clean out the filter after a runner or to coat the surfaces of the filtering plates with kieselguhr, etc.

I have found that all of the disadvantages just referred to and many others may be overcome by making the leaf-filters in tubular form, and that this form of filter is also exceedingly well adapted for continuous operation, for the reason that the wash liquor may be readily run through these tubular filters to clean them, and the kieselguhr liquor may be also readily passed through in the same manner. The preferred type of filtering apparatus employed by me is one in which a tubular leaf-filter proper of relatively great length as compared with its cross-sectional area is connected at will with tanks containing the kieselguhr liquor, the liquid to be filtered and the wash liquor, and these passed through said tube in such a manner that each is displaced and supported in position in the tube by the next succeeding fluid. Such a construction of course permits the various fluids to be forced through the tubular filter under high pressure and in contact with substantially the maximum area of filtering surface and maintained at a high temperature. As the filter is always filled with the fluid in use at the time, whether this is the kieselguhr liquor, the liquor to be filtered or the wash liquor, it will be clear that the kieselguhr coating will always be properly supported on the filtering surfaces and the cake on said surfaces will also always have proper support. The preferred type of filtering apparatus employed by me is one in which the tubular filter is divided into a large number of independently removable sections connected in series and mounted in an inclosing chamber so as substantially to fill the same, the construction being such that steam may be passed through said chamber in contact with the outer walls or shells of the filtering units and the solutions passing therethrough kept at the maximum temperature desired.

Other objects and advantages of the invention will appear in the following description and be illustrated in the accompanying drawings, in which—

Figure 1 is a general view, mainly diagrammatic, of a filtering apparatus constructed in accordance with my invention together with appurtenances and connections for coating, washing, etc.

Fig. 2 is an enlarged longitudinal section of two of the filtering elements or units, with their containing tubes or shells, connecting elbows or bonnets, stuffing-boxes, etc.

Fig. 3 is a cross-section on line 3—3, Fig. 2, of one of said filtering elements.

Fig. 4 is an end elevation of a portion of one of the elbows or bonnets for connecting adjacent filter units.

Figs. 5 and 6 are transverse and longitudinal sections of a modified type of tubular filtering element containing three sets of filtering screens.

Fig. 7 is a sectional detail illustrating a modification of the connections for adjoining filter units, no bonnets being employed in this type of structure.

Fig. 8 is an end elevation of one of the heads 6.

Similar characters designate like parts in all the figures of the drawings.

My invention may be embodied in a filtering apparatus of any form and construction so long as the main element of the apparatus is a tubular or cylindrical leaf-filter through which the liquid to be filtered may be circulated from one end to the other of said tube. Preferably, however, it is embodied in an apparatus in which the tubular or cylindrical leaf-filter is divided into a multiplicity of individual filter elements or units connected in such a manner that the units may be removed separately without interfering with others. The manner in which the sections are connected with one another may also be any suited to the particular use to which the apparatus is to be put, but ordinarily all of the units will be connected in series in such a manner that any fluid to be passed through them can return to the point of beginning and thus move in a complete cycle. The connections should be such that each of the different fluids or liquids intended to be passed through the filtering tubes may move in this manner. The individual filtering units will also preferably be placed close together so that they will approximately fill a given space and will usually be mounted in an inclosing chamber through which steam may be circulated over the outer sides of the inclosing tubes or shells of the filtering units.

Referring particularly to Figs. 1 to 4 inclusive, which illustrate one way in which the invention may be embodied in apparatus suitable for sugar work, 2 designates the outer imperforate tube or shell of the various filter units illustrated. Within this inclosing shell and spaced at some distance from it is the filtering element proper, which is shown as a tubular or cylindrical element which in other respects is or may be of the usual structure met with in leaf-filters, it having inner and outer filtering surfaces 3 and 4 separated by the usual coarser metallic spacing cloth 5. The space between the filtering surfaces 3 and 4 should of course be sufficient to permit a free flow of the filtrate therethrough. This tubular filtering element proper may be supported in the outer inclosing shell 2 in any desired manner. Here each end of each filtering unit proper has a cap or head 6 having openings 6' for the passage of liquids and with a passage 7 for the filtrate, which passage is shown as communicating with an outlet-pipe 8 in the line of the longitudinal axis of the tubular filtering element. These outlet-pipes 8 at each end of each individual element form with the channels in the head 7 filtrate passages which in the construction shown all preferably communicate with a common discharge-pipe at one end or the other of the apparatus, the pipe at one end being indicated by 9 and the other by 10. For convenience in removing any individual filtering element proper with its outlet-pipes the common pipes 9 and 10 are shown as made up of sections, each of which sections is connected directly to and removable with a corresponding filter unit.

The specific construction illustrated in the main views is one in which the straight cylindrical shells 2 are secured in place by being headed up in suitable openings in a pair of tube-sheets 11 and 12 at opposite ends of a chamber C, the main casing portion of which is designated by 13. The tube-sheets 11 and 12 are secured to the ends of the casing element 13 in any suitable manner to form a tight casing for inclosing each individual tube 2 and the filter element proper contained therein. Here adjacent tubes or shells 2 are shown as connected in series by means of elbows or bonnets, such as 14, which may be held against the adjacent tube-sheet by bolts, such as 15. At their inner ends these elbows are shown as having beveled outer annular bearing surfaces or seats which coöperate with metal gaskets, such as 16, seated in recesses 17 in the tube-sheet, and these gaskets also seat against the beveled surfaces 18 on the elbows or bonnets 14. By means of this construction a fluid-tight connection is made between the ends of adjoining filter units. It will be noticed in this case that all the shells 2 are connected in such a manner as to constitute a single long series filter.

Each of the outlet-pipes 8 has in it a shut-off valve 19 and each pipe at the right has a try-cock 20, the former for cutting out the filter element temporarily and the latter for testing the quality of the filtrate at one end of each individual filter element. The different individual elements may be removed individually without interfering with others by unbolting the proper bolts 21 or 22 of the flanged sections of the common outlet-pipes 9 and 10 and then unscrewing the parts as far as the shut-off valve 19, removing the elbows or bonnets 14 at each end of the filter unit to be removed and then drawing out the tubular filter element proper.

The apparatus so far described constitutes the principal part of the filter, but in connection with it I have also shown means for passing a suitable fluid or fluids through the filter in order to bring about the results previously mentioned. The principal connections I employ are such as are suitable for passing through the filter proper previously described the liquor to be filtered, a washing medium and a suspension of kieselguhr for coating the filter surfaces. 23, 24 and 25 indicate respectively sources of supply of the liquor to be filtered, the clean water for washing and the kieselguhr liquor, and 26 and 27 show pumps, preferably motor-driven centrifugal pumps, for forcing the different liquids through the system of pipes illustrated and through the units of the filter proper. Here a main pipe 28 connects with the upper unit of the filter shown in Fig. 1, and the three sources of supply 23, 24 and 25 are represented as connected in parallel with said pipe by main pipes 29, 30 and 31. There is also a pipe connection from the supply tank 23 for the liquor to be filtered to the pump 26, which pipe is indicated at 32. The other side of said pump is connected by a pipe 33 with a pipe 34 leading from the lowermost filter unit directly to the pump 27, the opposite side of which connects through a pipe 35 with the pipe 30 leading from the kieselguhr tank 25, there being free communication between the pipes 30 and 35 at their point of crossing. At the outer end of the apparatus the common filtrate-discharge pipe 10 leads to a pipe 36 through which the clear filtrate is intended to pass in one direction and in the other direction the wash water.

For the purpose of controlling the flow of the different fluids through the filter the main pipe system just described is represented as having a considerable number of valves for opening and closing communication at different times to different parts of the system and in different ways. Special attention is called to the fact that with the exception of the pumps the various valves illustrated are the only movable parts of the apparatus shown, and that said filtering apparatus is therefore a stationary apparatus through which liquids are circulated in a manner which will now be described.

The main valves shown in Fig. 1 are those designated by 37 to 48 inclusive. In the ordinary operation of the apparatus or system illustrated in Fig. 1 I proceed as follows:

The valve 39 is opened and the valves 37 and 38 are shut and the valve 40 is also opened and the valve 41 shut. This gives a clear path for the kieselguhr liquor from the supply-tank 25 through the pipes 30 and 35, the pump 27 and the pipe 34 to the lowermost filter element, and the liquor will be passed through all of the filter elements in series and will pass out of the upper end of the apparatus into the pipe 28. At this time the valve 43, it should be understood, will be shut and the valve 42 open, so that there will be a clear return path through the pipe 31 for the kieselguhr liquor to its tank 25. The liquor will of course fill the tubes, the excess returning to the tank 25. In order to deposit the kieselguhr on the filter surfaces the valve 42 should be shut and also the valve 47, whereupon clear water will flow from the pipe 10 and discharge from 36.

The next operation in the cycle is filling the filter with the liquor to be filtered. To do this the valves 40 and 43 should be shut and the valves 41 and 42 opened. This liquor will then pass from the supply-tank 23 through pipe 32, pump 26 and pipe 33, and will be forced through the filter from the lowermost unit shown in Fig. 1 to the upper one and will push out the kieselguhr liquor through pipes 28 and 31, which liquor will then return to its own tank. When the liquor to be filtered appears at the valve 42 this valve and the valve 43 should both be shut. This will cause the liquor from the tank 23 to be filtered, and the filtrate will appear in the outlet-pipes from the filter elements proper. At first some sweet water may appear which will discharge through the valve 48 and pipe 36. When the heavy liquor of the filtrate appears this valve 48 is closed and the valve 47 is opened to permit the clear filtrate to pass through the pipe controlled by the valve 47.

While filtration is taking place all the space around the tubes should be completely filled with steam, which may be accomplished by opening the steam-valve 49. This keeps the liquor in the most fluid condition for filtration and increases the capacity of the filter.

When the rate at which filtration can be done economically has been passed the filtering apparatus is emptied of the unfiltered material in the tubular filter elements by displacing it by water. In order to accomplish this the valves 38, 39, 41, 42 and 45 are closed and the valves 37, 40, 43 and 44 are opened. This gives a clear path for the water from the source of water supply 24 through the pipe 35 and the pipe 34 and the filter through which the water passes and emerges through the pipe 28, which is then in communication through the pipe 29 with the tank 23 containing the supply of liquor to be filtered. The circulation of the clear wash-water through this path causes the liquor in the filter-tubes to be pushed before it and returned to its supply-tank 23. When water appears at the valve 44 this valve should be shut and also the valve 46. This will cause the clear wash-water to penetrate the cake that was deposited upon the filtering surfaces, and the sugar therein will be removed, the sweet water resulting from this operation issuing from the outlet-pipe 10 and discharging through the valve 48, which should then be open, into the pipe 36.

When the cake on the filter surfaces is thus sweetened off the valves 45 and 38 are opened, which causes the wash-water to return to the pump 27 through the pipe 30 and the pipe 35 by which it is circulated rapidly back and forth through the filtering tubes, removing the cake from the filter surfaces.

To discharge the cake and water the valves 46, 39 and 40 are opened and the valve 38 is shut. This causes kieselguhr and water to be drawn through the pipe 35 by the pump 37 and forced through the pipe 34 into the filter-tubes, pushing the cake and water before it, which discharge through the pipe at 46. When kieselguhr appears at this point the valves 46, 42 and 43 should be shut, which causes the kieselguhr to deposit again upon the filter surfaces.

This completes one cycle of operation of the apparatus. It will be obvious that without loss of time another cycle may be begun and that in each cycle some one of the different fluids or liquids employed in the process always completely fills all parts of the filter and affords positive support for the kieselguhr deposited on the filtering surfaces, or for the cake, as the case may be, and that each different kind of fluid is displaced by the action of another which follows it up and forces it out substantially without mixing therewith, thus assuring a practically perfect separation of the different liquids at all times during each cycle of operations. The coating, filtering and cleaning operations are so performed that each is complete in itself and each leaves the apparatus in proper condition for the next step in the process to take place, so that the process can be performed an indefinite number of times without stopping the action or taking the apparatus apart for any purpose. Thus by the mere manipulation of the valves and working of the pumps there results a continuous process of filtering in which the cycle of operations may be repeated indefinitely.

In Figs. 5 and 6 I have illustrated a modification in which the outer shell 2 contains three sets of filtering surfaces, which are designated by 50, 51 and 52 respectively. The screens 50 and 51 have double filtering surfaces, as in the previous views, but the screen 52 has only a single filtering surface. Three heads 53, 54 and 55 are shown for connecting the filtrate passages to a common outlet-pipe. These views illustrate the point that a multiplicity of parallel tubular screens may be employed in accordance with my invention in a single filtering element.

In Fig. 7 I have illustrated a modification of the invention, and particularly of the means for connecting the individual pipes 2 in series. Instead of the individual elbows or bonnets of the other views I have shown a casing-head 56 common to all of the tubes 2 at one end of the apparatus, this being formed with partition walls 57 and intervening spaces through which communication is made as desired from one pipe 2 to another. The inlet-pipe 34 is shown at the lower end of this view.

What I claim is:

1. The combination with a filtering apparatus, of a head having a filtrate passage, and two filter media connected with said head, one of said media having a peripheral filtering surface surrounding the other media which has an interior filtering surface and forming a filtrate passage between communicating with the filtrate passage in the head.

2. The combination with a filtering apparatus, of a head having a filtrate passage, and two cylindrical filter media connected with said head, one of said media surrounding the other and forming a filtrate passage between communicating at its end with the filtrate passage in the head.

3. The combination with a filtering apparatus, of a pair of heads having filtrate passages, and two filter media connected with said heads, one of said media surrounding the other and forming a filtrate passage between communicating at its ends with the filtrate passages in said heads.

4. The combination with a filtering apparatus, of a pair of heads, each having a filtrate passage, two filter media connected with said heads, one of said media surrounding the other and forming a filtrate passage between communicating at its ends with the filtrate passages in said heads, and a pair of outlet pipes, one connected to each, by means of which said heads and media are supported.

5. The combination with a filtering apparatus, of a pair of heads each having a filtrate passage, and two cylindrical filter media connected at their ends with said heads, one of said media surrounding the other and forming a filtrate passage between communicating at its ends with the filtrate passages in said heads.

6. The combination with a filtering apparatus, of a head having a filtrate passage, two filter screens connected to said head, one of said screens having a peripheral filtering surface and surrounding the other screen which has an interior filtering surface, and means for separating said screens to form a filtrate passage between them communicating with the filtrate passage in the head.

7. The combination with a filtering apparatus, of a head having a filtrate passage, two cylindrical filter screens connected to said head, one of said screens surrounding the other, and means for separating said screens to form a filtrate passage between them communicating at its end with the filtrate passage in the head.

8. The combination with a filtering apparatus, of a pair of heads each having a filtrate passage, two filter screens connected at their ends to said heads. One of said screens surrounding the other, and means for separating said screens to form a filtrate passage between them communicating at its ends with the filtrate passages in said heads.

9. The combination with a filtering apparatus, of a pair of heads each having a filtrate passage, two cylindrical filter screens connected at their ends to said heads, one of said screens having a peripheral filtering surface surrounding the other screen which has an interior filtering surface, and means for separating said screens to form a filterate passage between communicating with the filtrate passages in said heads.

10. The combination with a filtering apparatus, of a pair of heads each having a filtrate passage, two cylindrical filter media connected at their ends to said heads, one of said media having a peripheral filtering surface surrounding the other media which has an interior filtering surface, and a cylindrical separator between said filter media which holds them apart and forms a filtrate passage between communicating with the filtrate passages in said heads.

11. A filtering apparatus comprising a tubular filter member mounted in an imperforate shell, said member embodying spaced tubular filter media mounted at their ends in heads having free communication with the filtrate passage between said media and having supporting pipes extend therefrom for the discharge of the filtrate, and detachable portions on the ends of said shells forming supports for said pipes and the filter media carried thereby.

12. A filtering apparatus comprising a filtering chamber of comparatively great length with respect to its cross-sectional area, a tubular filter of comparatively great length with respect to its diameter mounted in said chamber and having a filtering surface substantially parallel to the longitudinal axis of said chamber, and means for passing liquids through said chamber in the direction of its length including means for passing a wash water therethrough at a velocity effective for scouring said filtering surface.

13. A filtering apparatus comprising an imperforate tube forming a filtering chamber, a filtering member supported in said filtering chamber, piping connected to said chamber for passing liquids to the filtering member, means connected to said piping for passing a specific liquid repeatedly through said apparatus, and means for finally discharging the same.

14. A filtering apparatus comprising an inclosing shell, a filtering member supported in said shell, piping connected to said shell for passing liquids therethrough, and means connected with said piping for passing the same liquid a number of times successively through said apparatus.

15. A filtering apparatus comprising a plurality of filtering chambers connected in series, a plurality of filtering members suitably connected, one in each chamber means for passing liquids into the filtering chambers, and means for passing a specific liquid repeatedly through the same.

16. A filtering apparatus, comprising a plurality of substantially parallel tubular-filters connected in series, and means for forcing therethrough a liquid to be filtered.

17. A filtering apparatus comprising a plurality of filtering chambers connected in series, a plurality of filtering members, one in each chamber, means for passing into said chambers a liquid to be filtered, means for passing a cleansing liquid repeatedly through the apparatus, and means for discharging the same.

18. A filtering apparatus, comprising a tubular filter, means for passing therethrough a liquid to be filtered, and means for passing a heating medium around said tube.

19. A filtering apparatus, comprising a tubular filter, means for passing therethrough a liquid to be filtered and means for passing steam around said tube.

20. A filtering apparatus, comprising a plurality of tubular leaf-filters disposed in tubes substantially in parallelism, and detachable elbows connecting adjacent ends of said tubes in pairs.

21. A filtering apparatus, comprising a pair of parallel tube-sheets, parallel tubular filters mounted at their ends in said tube-sheets, and detachable elbows connecting adjacent ends of said tubes in pairs.

22. A filtering apparatus, comprising a closed chamber having a pair of parallel tube-sheets, parallel tubular filters substantially filling said chamber and each having an imperforate shell mounted at its ends in said tube-sheets and containing spaced tubular filter surfaces, means for connecting said imperforate shells in series, and means for passing steam through said chamber around said shells.

23. A filtering apparatus, comprising a plurality of tubular filters disposed substantially in parallelism and each having an imperforate inclosing shell containing spaced tubular filtering surfaces mounted at their ends in heads having free communication with the filtrate passage between said surfaces and having outlet pipes extending therefrom, and means for connecting said imperforate shells in series.

24. A filtering apparatus, comprising a plurality of tubular filters disposed substantially in parallelism and each having an imperforate inclosing shell containing spaced tubular filtering surfaces mounted at their ends in heads having free communication with the filtrate passage between said surfaces and having supporting pipes extending therefrom for the discharge of the filtrate, and detachable elbows connecting adjacent ends of said shells in series and forming supports for said pipes and the filters proper carried thereby.

25. A filtering apparatus comprising an outer chamber, an imperforate tube in said chamber secured in opposite walls thereof, means for passing a heating medium into said outer chamber, a tubular filter embodying concentric filtering surfaces, and means for detachably supporting said filter in said imperforate tube.

26. A filtering apparatus comprising an outer chamber, an imperforate tube in said chamber secured in opposite walls thereof, means for passing a heating medium into said outer chamber, a tubular filter embodying concentric filtering surfaces, means for detachably supporting said filter in said imperforate tube, and means for passing through said filter a liquid to be filtered.

27. A filtering apparatus comprising an outer chamber, an imperforate tube in said chamber secured in opposite walls thereof, means for passing a heating medium into said outer chamber, a tubular filter embodying concentric filtering surfaces, means for detachably supporting said filter in said imperforate tube, and means for passing through said filter successively, specifically different liquids, one of which is the liquid to be filtered.

28. A filtering apparatus comprising an outer chamber, an imperforate tube in said chamber, secured in opposite walls thereof, means for passing a heating medium into said outer chamber, a tubular filter embodying concentric filtering surfaces, means for detachably supporting said filter in said imperforate tube, and means for passing through said filter successively a precoating liquid and a liquid to be filtered.

29. A filtering apparatus comprising an outer chamber, an imperforate tube in said chamber, secured in opposite walls thereof, means for passing a heating medium into said outer chamber, a tubular filter embodying concentric filtering surfaces, means for detachably supporting said filter in said imperforate tube, and means for passing through said filter successively a precoating liquid, a liquid to be filtered, and a wash water.

Signed at Brooklyn in the county of Kings and State of New York this 20th day of June A. D. 1916.

EDWARD E. CHAPIN.